United States Patent [19]
DeRodeff et al.

[11] Patent Number: 5,828,403
[45] Date of Patent: Oct. 27, 1998

[54] METHOD AND SYSTEM FOR SELECTING AND RECEIVING DIGITALLY TRANSMITTED SIGNALS AT A PLURALITY OF TELEVISION RECEIVERS

[75] Inventors: Stephen DeRodeff, Westminster; Christopher J. Rust, Lafayette, both of Colo.

[73] Assignees: U S WEST, Inc., Denver; MediaOne Group, Inc., Englewood, both of Colo.

[21] Appl. No.: 577,192

[22] Filed: Dec. 22, 1995

[51] Int. Cl.⁶ .............................. H04N 7/173; H04N 7/16
[52] U.S. Cl. ................................. 348/7; 348/6; 348/12; 348/10; 348/13; 455/3.1; 455/5.1
[58] Field of Search .................................. 348/6, 7, 8, 10, 348/12, 13; 455/4.2, 6.2, 6.3, 5.1; H04N 7/173, 7/16

[56] References Cited

U.S. PATENT DOCUMENTS

| | | | |
|---|---|---|---|
| 4,667,243 | 5/1987 | Blatter et al. | 358/191.1 |
| 4,947,244 | 8/1990 | Fenwick et al. | 455/5.1 |
| 4,994,909 | 2/1991 | Graves et al. | 348/7 |
| 5,206,722 | 4/1993 | Kwan | 348/7 |
| 5,351,075 | 9/1994 | Herz et al. | 348/1 |
| 5,387,927 | 2/1995 | Look et al. | 348/7 |
| 5,412,416 | 5/1995 | Nemirofsky | 348/10 |
| 5,488,412 | 1/1996 | Majeti et al. | 348/12 |
| 5,524,272 | 6/1996 | Podowski et al. | 348/13 |
| 5,574,964 | 11/1996 | Hamlin | 348/12 |
| 5,592,482 | 1/1997 | Abraham | 348/8 |
| 5,617,331 | 4/1997 | Wakai et al. | 455/3.1 |
| 5,640,453 | 6/1997 | Schuchman et al. | 348/12 |

*Primary Examiner*—John K. Peng
*Assistant Examiner*—Linus H. Lo
*Attorney, Agent, or Firm*—Peter J. Kinsella

[57] ABSTRACT

A method and system for broadcasting at least one of a plurality of digitally encoded signals transmitted by a network provider to a plurality of user programmable devices disposed in a single environment. A remote interface unit is coupled to each of the user programmable devices for receiving a user programming from one of the plurality of user programmable devices. The user programming selects one of the plurality of compressed, digitally encoded signals. A common set-top transceiver is operatively connected to each of the remote interface units and the network provider including a first receiver for receiving the user programming from each of the remote interface units and a transmitter for transmitting the user programming to the network provider. The common set-top transceiver also includes a second receiver for receiving the selected one of the plurality of digitally encoded signals from the network provider and at least one video processing module for broadcasting the selected one of the plurality of digitally encoded signals to the plurality of user programmable devices based on the user programming.

26 Claims, 6 Drawing Sheets

Downstream
Video/Data

Downstream
Signaling/Control

Upstream
Video/Data

Upstream
Signaling/Control

METHOD AND SYSTEM FOR SELECTING AND RECEIVING DIGITALLY TRANSMITTED SIGNALS AT A PLURALITY OF TELEVISION RECEIVERS

TECHNICAL FIELD

This invention relates to methods and systems for selecting and receiving digitally transmitted signals at a plurality of television receivers in a bi-directional digital transmission system.

BACKGROUND ART

Video-on-demand, home shopping, and electronic games are typical of the services provided by an interactive television system. For interactive television environments with a great many users, video servers must transmit data at rates far in excess of those of common computer systems. For example, a video server connected to 2500 on-line subscribers will need an output capacity of nearly 1 GB/s. The exacting nature of this requirement is compounded by the isochronous nature of the video output-the fact that real-time video must be delivered at a constant data rate. These data rates must also be transmitted over distances of several hundred kilometers.

In order to satisfy these strict data output requirements, many video server manufacturers and network providers have selected Asynchronous Transfer Mode (ATM) transport over Synchronous Optical Networks (SONET), which can provide output rates up to 2.5 GB/s. ATM sends data in packets that include the address of their destinations. Its advantages for video distribution networks include bandwidth scalability and transparency to (or non-interference with) the application. SONET systems send signals over optical fiber and complement ATM by providing standardized interfaces, high rates of data transmission, and high reliability.

Broadband networks enable video servers to communicate with a set-top box in the home. These networks are asymmetrical in nature, with high bandwidth capacity from the network provider to the set-top box (the downstream channel) and lower bandwidth from the set-top box to the network provider (the upstream channel). Typically, bandwidth downstream is 20 Mb/s, and upstream 2.0 Mb/s. Obviously, the network's greater downstream bandwidth handles compressed video and audio, while the slender upstream connection carries the signals from users that control an interactive application on the network provider.

The downstream signals, if analog, are digitized, compressed, and, if the ATM delivery is used, adapted to ATM. The signals emerge from all this processing in the same format as any digital broadcast video streams entering the network. The compressed and ATM-adapted video streams are then multiplexed with the video-on-demand and/or data channels before being passed to the access network.

In a hybrid access network, consisting of optical fiber and coaxial cable, the combined streams, including Radio Frequency (RF) modulated analog programs, are distributed by means of a tree-and-branch bus network. The digital bit streams from multiple programs are multiplexed into 6-MHz bands, regardless of format. Thus, one 6-MHz band can carry one analog program or multiple digital programs and applications.

The receiving equipment tunes to a 6-MHz band and filters either the analog program or a labeled digital stream corresponding to the program requested. In fiber-to-the-home or -curb access networks, analog programs are distributed digitally, along with digital programs and data, in a multiplexed stream over a dedicated bandwidth allocated to a subscriber. The stream travels over point-to-point optical links from the central hub either directly to each subscriber or indirectly, to neighborhood units and thence by coaxial and/or twisted copper wire to each customer.

For video-on-demand services, subject matter or content is stored in video and multimedia servers, typically in the Moving Picture Experts Group's, MPEG-2, format. The MPEG-2 format compresses data efficiently and includes a system layer through which it is possible to add functions such as closed captioning and multilingual audio.

A video program is constituted of multiple packetized elementary streams having a common time base. For example, the video, audio, and data components-or elementary streams-are multiplexed into a single program stream, which may be of a variable packet size, for local storage and transfer. A transport stream is derived from elementary stream packets or program stream packets or user data packets of one or more programs with an independent time base. A transport stream consists of 188-byte packets that also carry timing information.

At the ATM adaptation layer, a transport packet or packets are encapsulated in an adaptation packet. This layer provides the functions that map applications and services to the ATM layer's characteristics.

Currently, one set-top box per TV is required in order to receive programming provided by the network provider. Each set-top box decodes the encoded, compressed digital signals for receipt by the analog TV. The known prior art fails to disclose a common set-top box that allows several TV's in a single environment each to receive video programming.

DISCLOSURE OF THE INVENTION

It is thus a general object of the present invention to provide a method and system for selecting and receiving digitally transmitted signals at a plurality of television receivers in a bi-directional digital transmission system.

It is another object of the present invention to provide a common set-top box for providing the digitally transmitted signals to the plurality of television receivers.

In carrying out the above objects and other objects, features and advantages, of the present invention, a method is provided for broadcasting a plurality of digitally encoded signals transmitted by a network provider to a plurality of user programmable devices. The method includes the step of receiving a user programming from one of the plurality of user programmable devices selecting one of the plurality of compressed, digitally encoded signals. The method also includes the step of transmitting the user programming to a network provider. Still further, the method includes the step of receiving the selected one of the plurality of digitally encoded signals from the network provider. The method also includes the step of broadcasting the selected one of the plurality of digitally encoded signals to the plurality of user programmable devices based on the user programming.

In further carrying out the above objects and other objects, features and advantages, of the present invention, a system is also provided for carrying out the steps of the above described method. The system includes a remote interface unit coupled to each of the user programmable devices for receiving a user programming from one of the plurality of user programmable devices. The system further includes a common set-top transceiver operatively connected to the each of the remote interface units and the network provider including: a first receiver for receiving the user programming from each of the remote interface units, a transmitter for transmitting the user programming to the network provider, a second receiver for receiving the selected one of the plurality of digitally encoded signals from the network provider, and at least one video processing module for broadcasting the selected one of the plurality of digitally encoded signals to the plurality of user programmable devices based on the user programming.

The above objects and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
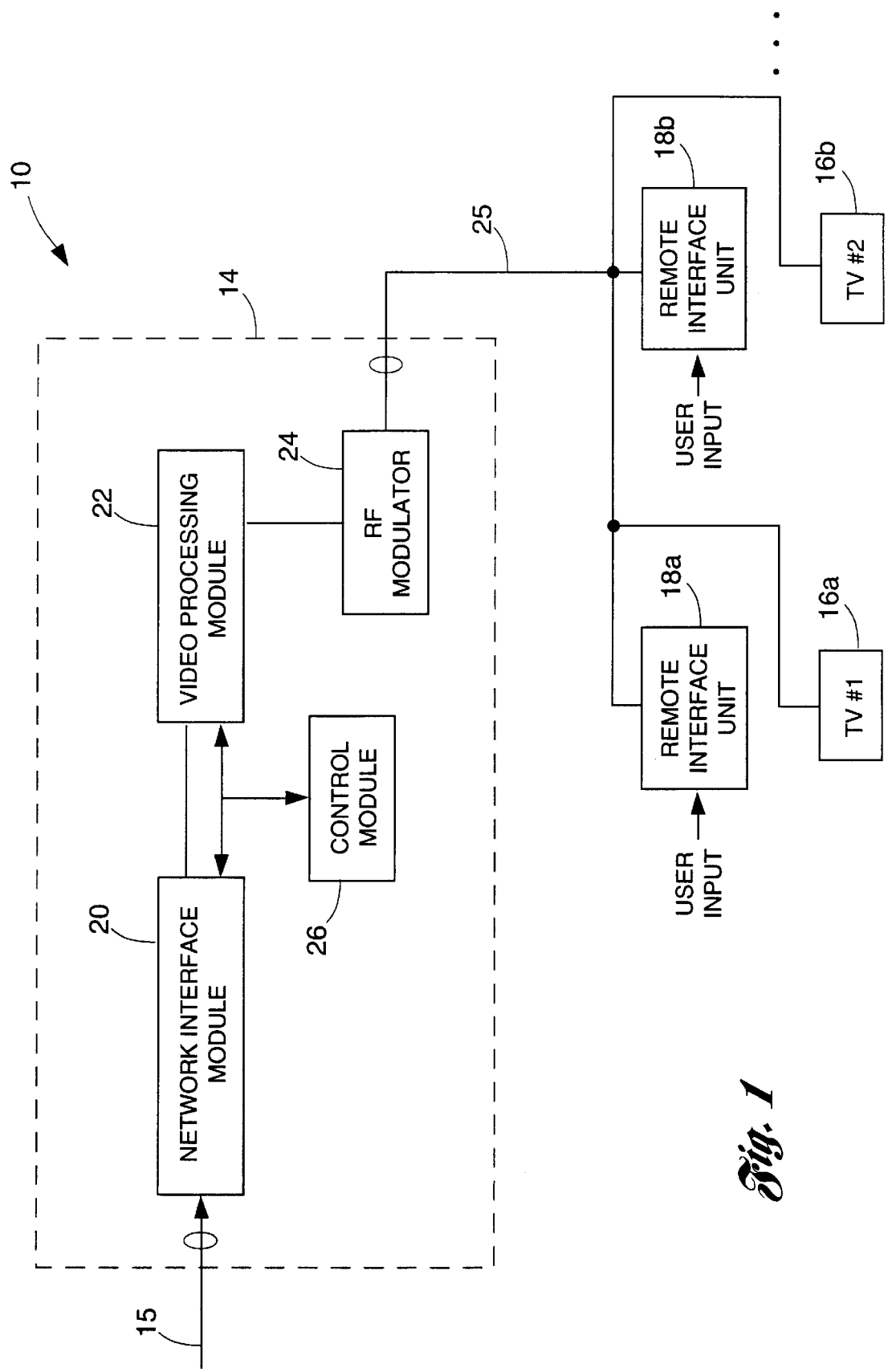
FIG. 1 is a block diagram of the system of the present invention.

Turning now to FIG. 1, there is shown a schematic diagram of the system of the present invention, denoted generally by reference numeral 10. The system 10 includes a common set-top box 14 connected to a network provider (not shown) via a network coaxial cable 15. The set-top box 14 decompresses compressed, digitally encoded signals received downstream from the network provider and converts each of the decompressed signals into one or more analog signals. The set-top box 14 also transmits each of the analog signals to one of a plurality of user programmable devices 16a, 16b, such as television receivers, based on a control signal transmitted by the user via a corresponding remote interface unit 18a, 18b.

In upstream communication, the set-top box 14 receives user programming information in the form of control signals from the user via one of the remote interface units 18a, 18b. The control signal includes information regarding the video programming the user wishes to view and information regarding the television channel the user wishes to view the information on. The remote interface units 18a, 18b transfer the control signals to the set-top box 14 which converts each of the control signals into a compressed, digitally encoded signal. The set-top box 14 then transmits the compressed, digitally encoded signal to the network provider.

Figure 2A:
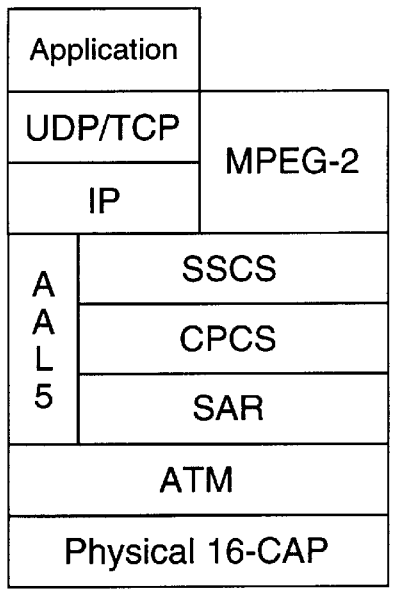
FIGS. 2a–2d are block diagrams of the software protocol stacks utilized in the operation of the present invention.
Figure 2B:
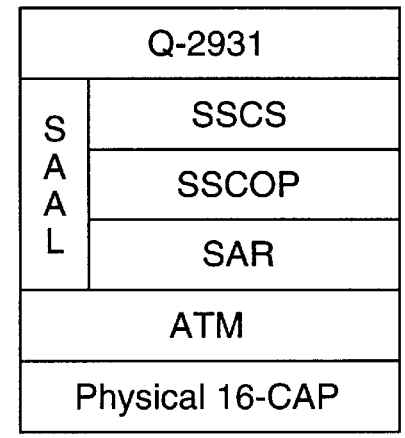
Figure 2C:
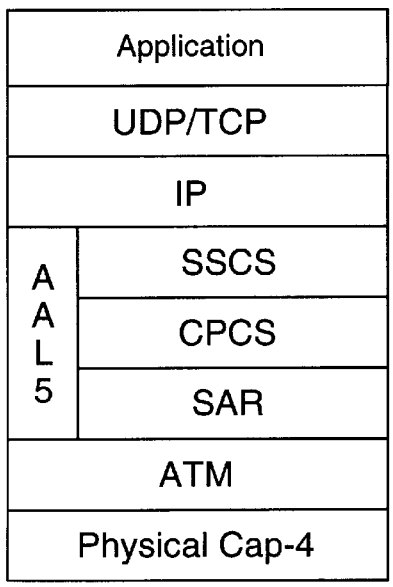
Figure 2D:
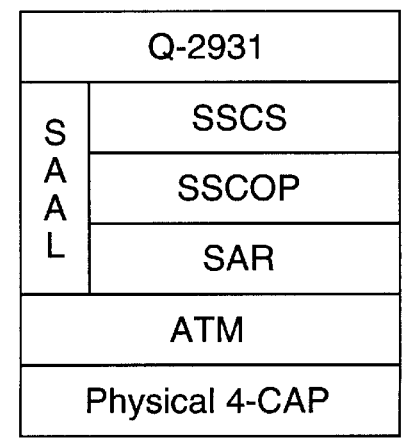

The protocol stacks necessary for setting up ATM connections and for delivering data over those connections are shown in FIGS. 2a–2d. Four protocol stacks are shown: FIG. 2a illustrates the protocol stack used for the downstream delivery of video and data; FIG. 2b illustrates the protocol stack used for the downstream delivery of signaling and control information; FIG. 2c illustrates the protocol stack used for the upstream delivery of data; and FIG. 2d illustrates the protocol stack used for the upstream delivery of signaling and control information. Q.2931 is the International Telecommunications Union (ITU) defined signaling protocol used to establish signaling connections across a User Network Interface (UNI).

In the downstream direction, MPEG-2 video is carried directly over an ATM Adaptation Layer 5 (AAL5). Other applications (including data applications) could be carried over either User Datagram Protocol (UDP) or Transmission Control Protocol (TCP) over Internet Protocol (IP) over AAL5. UDP is used to send connectionless data, while TCP is used to send connection-oriented data when assured delivery is required. IP is necessary for both UDP and TCP.

AAL5 can be used to transport either IP or MPEG-2 packets. AAL5 receives data and segments it into 53 byte ATM cells. These ATM cells are then passed to the ATM layer for routing and transport over the physical layer. AAL5 is composed of two sublayers, the Service Specific Coordination Subfunction (SSCF) and the Common Part (CP). In turn, the SSCF is composed of the Service Specific Convergence Sublayer (SSCS) and the Service Specific Connection Oriented Protocol (SSCOP). For AAL5 the CP is composed of a null Common Part Convergence Sublayer (CPCS) and a Segmentation and Reassembly (SAR) sublayer. The SSCF and SSCOP of AAL5 is sometimes referred to as either Signaling ATM Adaptation Layer (SAAL) or Q.SAAL. SSCOP is defined in ITU Recommendation Q.2110. SSCS is defined in ITU Recommendation Q.2130.

The SSCS supports network or access signaling. SSCOP is used to provide assured delivery of data. The segmentation function of the SAR segments incoming data into 53 byte ATM cells. The reassembly portion of the SAR reassembles ATM cells into their original format.

The ATM layer of the ATM architecture is a service independent layer which routes the ATM cells created by the SAR function of AAL5. Routing is based on Virtual Path (VP) and Virtual Channel (VC) information found in the 5 byte header of the ATM cells. The headers, and their associated routing information, are created during the segmentation process. The ATM layer uses the Physical layer (PHYS) to transport the ATM cells. The PHYS layer includes a Transmission Convergence (TC) sublayer which is responsible for making sure valid cells are being created and transmitted. This involves breaking off individual cells from the data stream of the higher layer (the ATM layer), checking the cell's header, and encoding the bit values. The PHYS layer also includes a Synchronous Transport Signal (STS-1) sublayer which helps to define the physical frame format. The PHYS layer further includes a 16 bit Carrierless Amplitude Phase (16-CAP) sublayer which modulates the ATM cells.

The upstream communication protocol includes the ATM PHYS layer having a 4 bit CAP sublayer for modulating the data from the set-top box 14. The PHYS layer uses Time Division Multiplexing (TDM) for transmitting ATM cells in an allocated time slot. The topmost sublayer of the PHYS layer is the Transmission Convergence (TC) sublayer which functions in the same manner as in the downstream communication. The next layer is the ATM layer which functions as described above.

Returning now to FIG. 1, the set-top box 14 includes a network interface module (NIM) 20 coupled to the network coaxial cable 15 for terminating all network-specific functions. For the ATM transport, the NIM 20 provides the physical interface and bit-timing capabilities for the physical layer of the ATM architecture. The NIM 20 also performs transmission frame recovery and cell delineation for the transmission convergence sub-layer. Still further, the NIM 20 creates cell headers and trailers, defines and identifies virtual channels and paths, and multiplexes and demultiplexes cells. Finally, the NIM 20 is also responsible for segmenting and reassembling the cells.

The set-top box 14 also includes at least one video processing module 22 for each in-home viewing channel available. The video processing module 22 is coupled to the NIM 20 for de-packetizing and decoding the compressed, digitally encoded signals and for converting the decoded signals into analog signals for receipt by the plurality of television receivers 16a, 16b. The at least one video processing module 22 also modulates each of the analog signals at a predetermined frequency corresponding to a virtual address of each of the video processing modules 22.

Still further, the set-top box 14 includes an RF modulator 24 coupled to the at least one video processing module 22 for modulating the analog signals onto a coaxial cable 25 coupled to each of the television receivers 16a, 16b and each of the remote interface units 18a, 18b. The RF modulator 24 combines all the analog signals onto the coaxial cable 25.

The set-top box 14 also includes a control module 26 coupled to the NIM 20 and to each of the video processing modules 22 for controlling transmission of the signals to and from each of the television receivers 16a, 16b. The control module 26 also provides a master system clock, provides run-time platform for a host of required applications, controls per-TV video processing modules 22 and performs ATM connection management.

Figure 3:
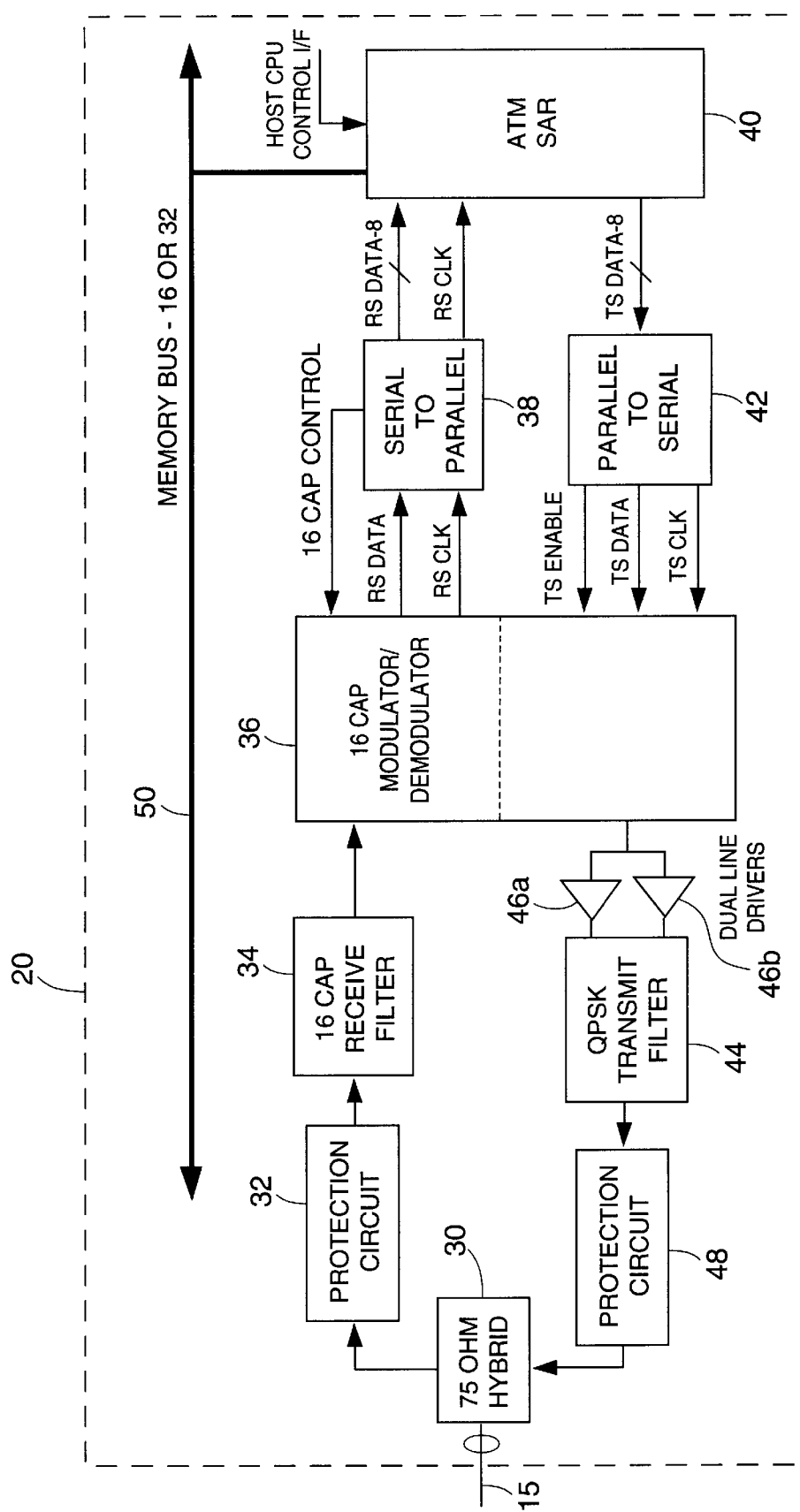
FIG. 3 is a block diagram of the network interface module of the system of the present invention.

Turning now to FIG. 3, there is shown a block diagram of the NIM 20 of the system 10 of the present invention. The NIM 20 includes a 75 ohm hybrid 30 coupled to the network coaxial cable 15 and a first protection circuit 32. The first protection circuit 32 provides electrical insulation during downstream communication. The NIM 20 also includes a 16 Carrierless Amplitude Phase (CAP) Receive Filter 34 coupled to the first protection circuit 32 for receiving modulated ATM packet streams carried over a SONET transport mechanism. These packets may contain video and audio information as well as signalling and control information. Typically, the video information is compressed utilizing the MPEG-2 format.

The 16 CAP Receive Filter 34 is coupled to a 16 CAP Modulator/Demodulator 36 for demodulating the modulated ATM packets into a baseband signal. In upstream communication, the 16 CAP Modulator/ Demodulator 36 modulates the received signal into the proper frequency for transmission back to the network provider. A 16 CAP Modulator/Demodulator such as a T7660/T7661 manufactured by AT&T is suitable for the present invention. The signal received by the 16 CAP Modulator/Demodulator 36 is transmitted downstream serially. Thus, a Serial to Parallel converter 38 is required to convert the serial data transmission into a parallel data transmission.

The NIM 20 further includes an ATM Segmentation and Reassembly (SAR) module 40 for reassembling the many ATM packets transmitted by the network provider. For upstream communication, the ATM SAR module 40 segments the data received into several ATM packets for transmission back to the network provider. A Parallel to Serial converter 42 converts the parallel upstream data transmission into a serial data transmission. An ATM SAR such as an L64360 manufactured by LSI Logic may be suitable for the system 10 of the present invention.

The NIM 20 further includes a Quadrature Phase Shift Keying (QPSK) Transmit Filter 44 having a pair of Dual Line Drivers 46a, 46b coupled to the upstream communication port of the 16 CAP Modulator/Demodulator 36. The QPSK Transmit Filter 44 modulates the received digital signal for transmission to the network provider. The Dual Line Drivers 46a, 46b drive the QPSK Transmit Filter 44 and provide amplification of the digital signal necessary for transmission of the data signal. Two Dual Line Drivers 46a, 46b are used to eliminate cross-talk. The output of the QPSK Transmit Filter 44 is coupled to a second Protection Circuit 48 for providing electrical insulation during upstream communication.

Figure 4:
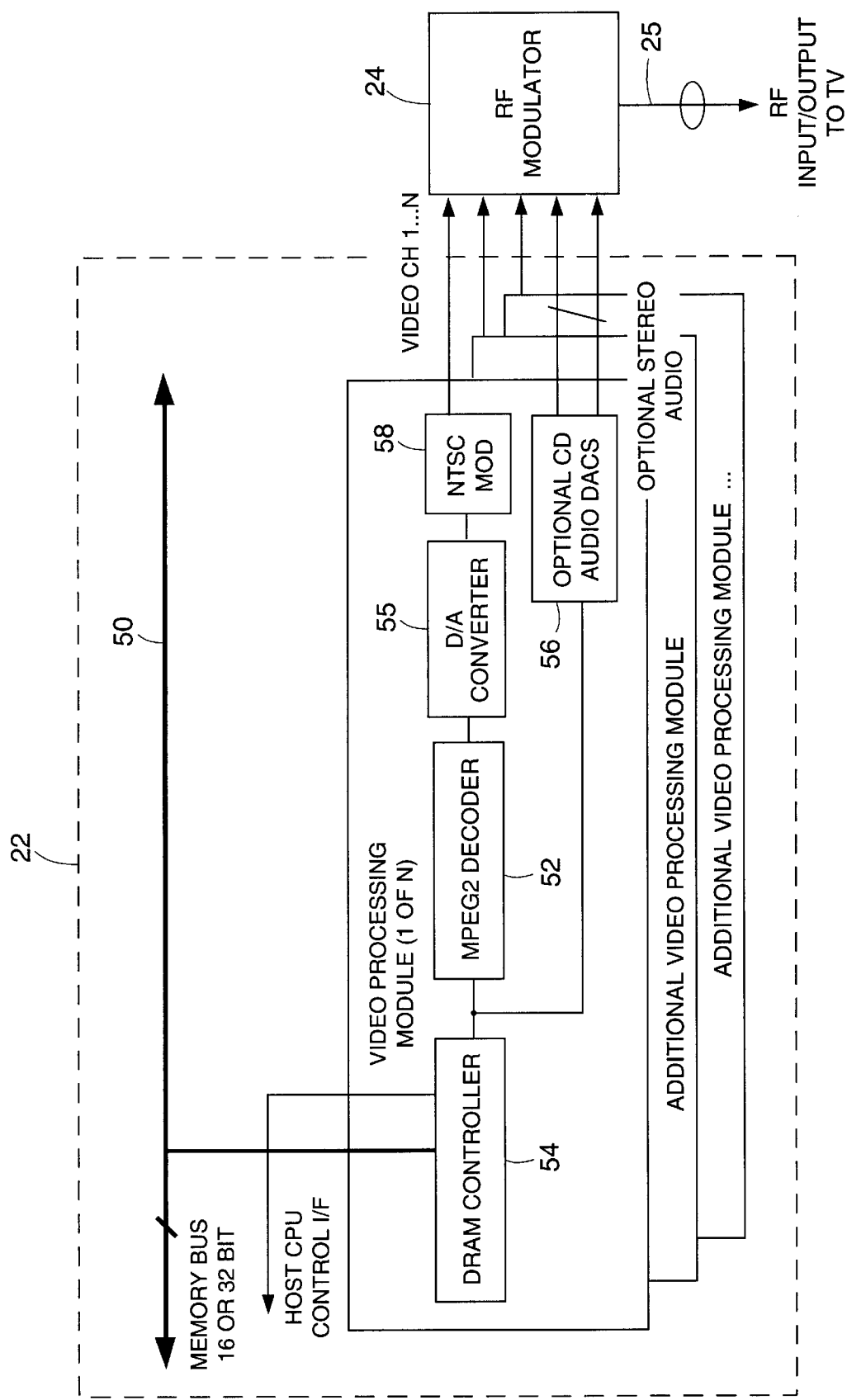
FIG. 4 is a block diagram of the video processing module of the system of the present invention.

Turning now to FIG. 4, there is shown a schematic block diagram of the video processing module 22 of the present invention. The video processing module 22 is provided for each viewing channel available in the local environment. If the television receiver includes a "Picture-in-Picture (PIP)" feature, then two video processing modules are necessary for the one television receiver. Each video processing module 22 is connected to a memory bus 50. The memory bus 50, either a 16-bit or a 32-bit bus, is provided for transmitting information among the various components of the set-top box 14. The video processing modules 22 decode the digital transmissions received from the network provider and converts the decoded digital signal into an analog format. This analog signal is then modulated onto a National Television System Committee (NTSC) frequency, as described below.

If the MPEG-2 format for digital compression is used, each video processing module 22 includes an MPEG-2 Decoder 52 to decode and decompress the encoded packets of information and a Dynamic Random Access Memory (DRAM) 54 to control the audio and video decoding. An MPEG-2 Decoder such as the L64002 manufactured by LSI Logic may be used. Each video processing module 22 also includes a Digital-to-Analog (D/A) Converter 55 for converting the digital signal into an analog signal. The video processing module 22 also includes Digital-to-Analog Converters (DACS) 56 for converting digital audio into analog audio as may be contained in the LSI Logic L64002.

The video processing module 22 further includes a NTSC Modulator (MOD) 58. The NTSC MOD 58 converts the analog output of the D/A Converter 55 into the NTSC standard television signal at a predetermined frequency. The predetermined frequency corresponds to a frequency of an RF channel of the RF spectrum, i.e., channel 3, channel 5, channel 7 and channel 9. Each RF channel corresponds to a selected frequency. Thus, each television receiver 16a, 16b may select one or more of the RF channels for viewing a video programming.

The output of the video processing module 22 is transferred to the RF Modulator 24 which modulates each analog signal onto a carrier signal so that all the analog signals can be combined onto the coaxial cable 25. Each TV 16a, 16b can then receive its corresponding program based on the RF channel selected for receiving the program.

Figure 5:
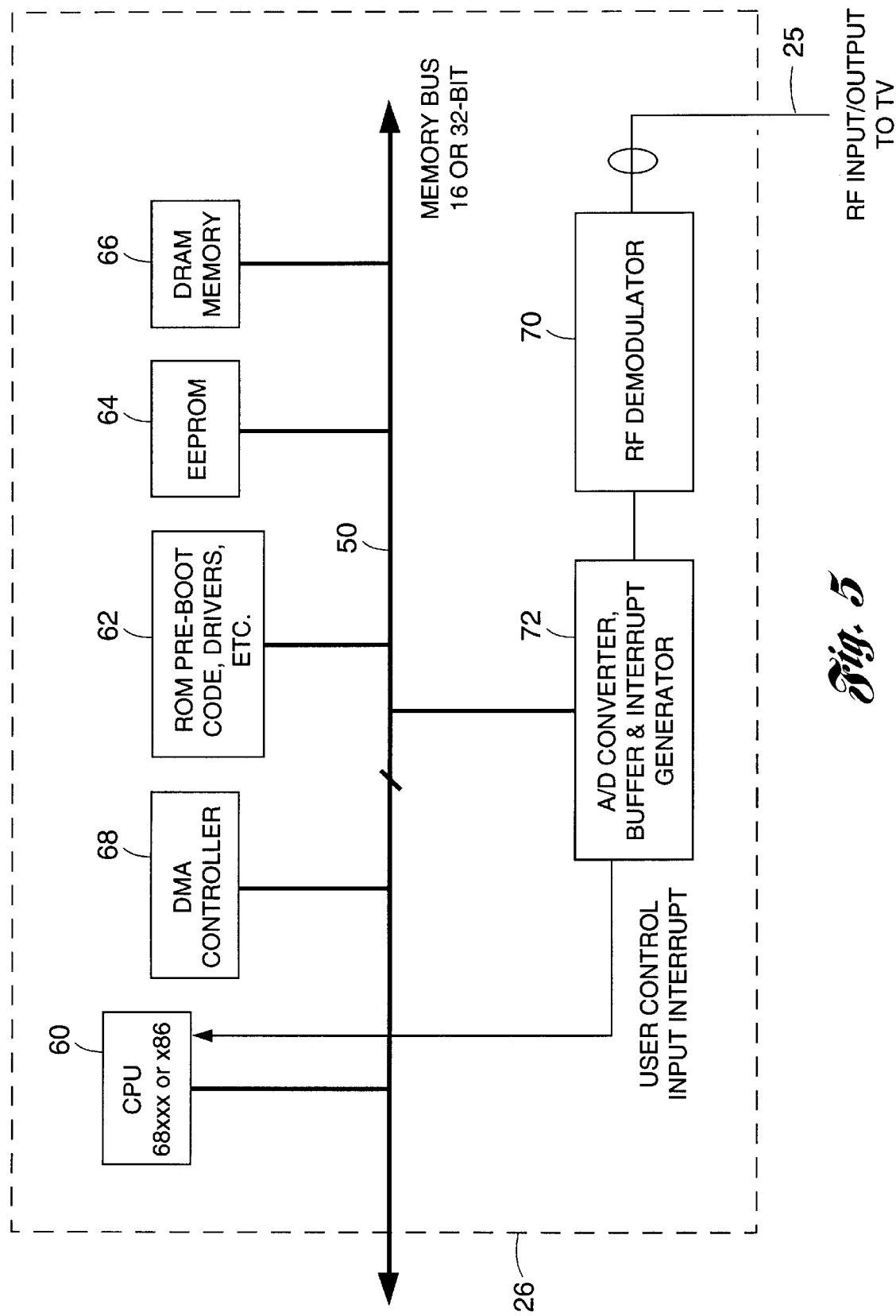
FIG. 5 is a block diagram of the control module of the system of the present invention.

Referring now to FIG. 5, there is shown a schematic block diagram of the Control Module 26 of the present invention. The Control Module 26 includes a Central Processing Unit (CPU) 60, such as a 68xxx or an x86. The Control Module 26 also includes a Read Only Memory (ROM) 62 for booting the operating system of the set-top box 14. The Control Module 26 further includes an Electronically Erasable, Programmable ROM 64 for storing non-volatile information, such as a user's identification number. Still further, the Control Module 26 includes a Dynamic Random Access Memory (DRAM) 66 which is the memory used for executing instructions and holding data temporarily. Dynamic RAM must be refreshed periodically in order to retain its information. The Control Module 26 also includes a Direct Memory Access (DMA) Controller 68 for controlling access to the memory bus 50. All of the devices in the Control Module 26 are connected to the memory bus 50.

The Control Module 26 further includes user interface components, such as an RF Demodulator 70 and an A/D Converter 72. The RF Demodulator 70 receives control information from the user via the coaxial cable 25. The RF Demodulator 70 demodulates the analog signal and transfers it to the A/D Converter 72 which converts the analog signal into a digital signal. The digital control signal from the user is then transferred to the CPU 60 and the ATM SAR 40. The ATM SAR 40 segments the digital control signal for transmission back to the network provider.

Figure 6:
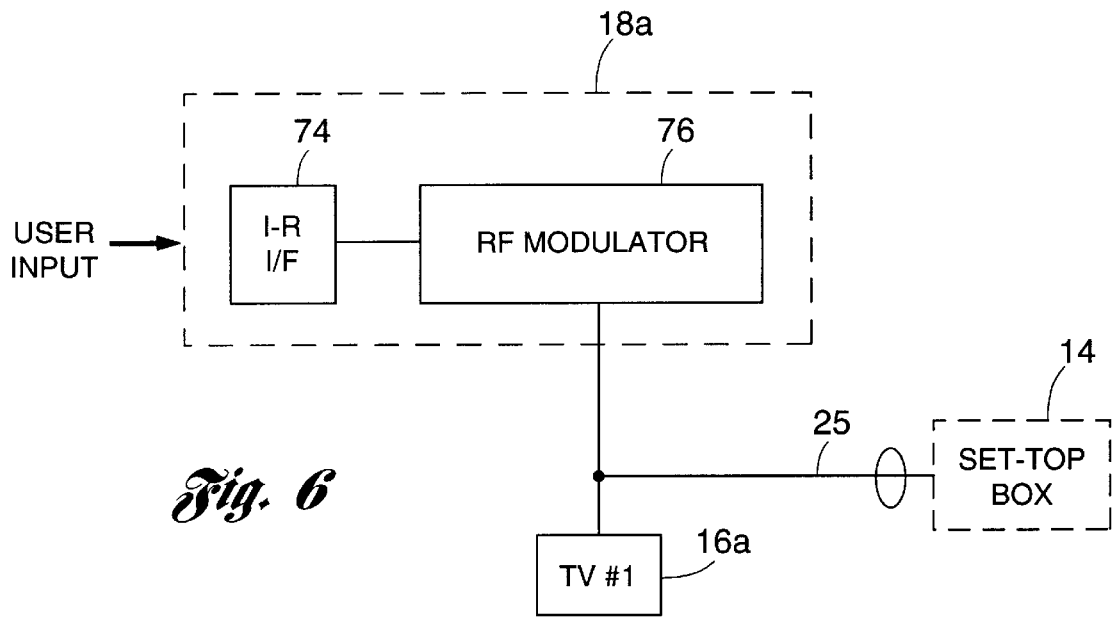
FIG. 6 is a block diagram of the set top terminal of the system of the present invention.

A schematic block diagram of the remote interface unit 18a of the present invention is shown in FIG. 6. The remote interface unit 18a is an inexpensive interface device that provides the necessary interface between the user of the TV 16a and the set-top box 14. The remote interface unit 18a includes an infrared interface 74 for receiving infrared signals from a television remote control (not shown). The infrared signals generated by the remote control (not shown) indicate the user's program selection. The remote interface unit 18a also includes an RF Modulator 76 for modulating the infrared signal onto the coaxial cable 25 for receipt by the set-top box 14.

Figure 7:
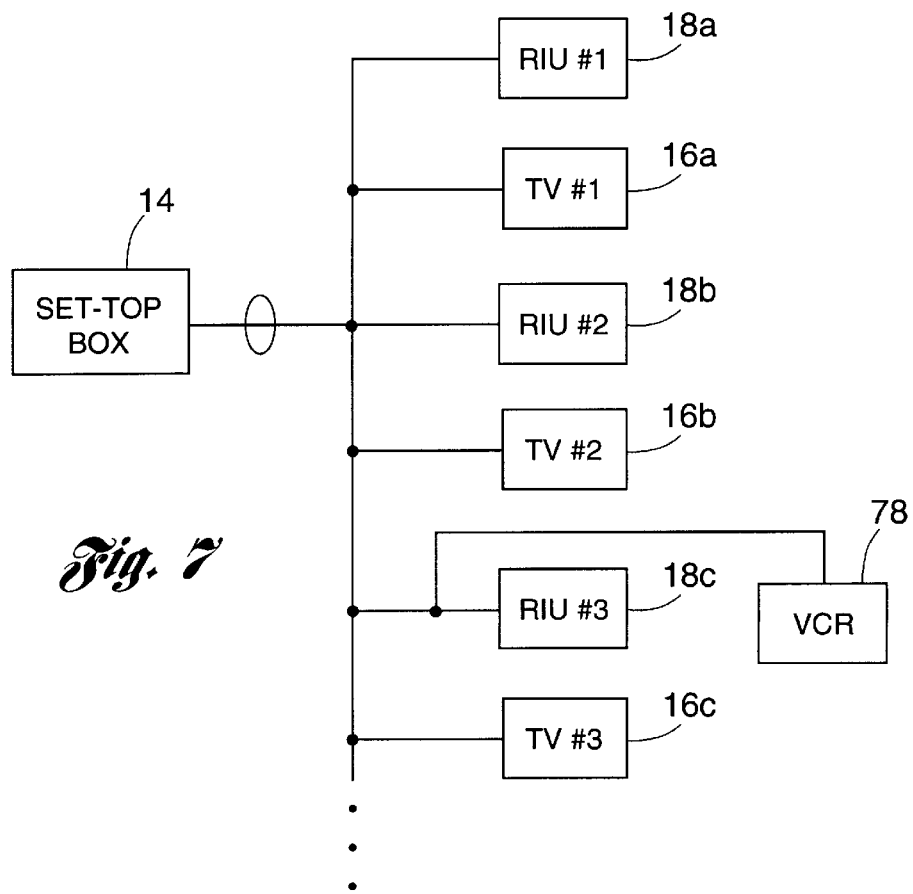
FIG. 7 is a schematic block diagram illustrating the system of the present invention.

A block diagram of the system 10 of the present invention is shown in FIG. 7 illustrating how several TV's 16a, 16b, 16c may be connected to a single set-top box 14 device. Each of the TV's 16a, 16b, 16c can display a program to the user on each available RF channel. FIG. 7 also illustrates how a Video Cassette Recorder (VCR) 78 may also be incorporated into the system 10 of the present invention.

Although the operation of the present invention has been described in connection with ATM delivery of MPEG-2 encoded data, the present invention is not limited to this application. The present invention may be utilized in conjunction with any type of data transmission, such as Transmission Control Protocol (TCP) over Internet Protocol (IP), Remote Procedure Calls, and IP over MPEG-2 transport frames.

While the best modes for carrying out the invention have been described in detail, those familiar with the art to which this invention relates will recognize various alternative designs and embodiments for practicing the invention as defined by the following claims.

What is claimed is:

1. For use with a network provider broadcasting multiple streams of compressed, digitally encoded signals, a method for transmitting the digitally encoded signals to a plurality of user programmable devices disposed in a single environment and coupled to a common set-top transceiver, the user programmable devices transmit and receive signals at a predetermined range of frequencies, the method comprising:

transmitting a user programming from each of the plurality of user programmable devices to the network provider via the common set-top transceiver at one of a plurality of frequencies within the predetermined range of frequencies, each of the user programmable device selecting the same or different one of the plurality of compressed, digitally encoded signals as each of the other user programmable devices;

receiving each of the selected ones of the plurality of digitally encoded signals from the network provider at the common set-top transceiver; and transmitting each of the selected ones of the plurality of digitally encoded signals to each of the plurality of user programmable devices based on the user programming transmitted by each of the user programmable devices.

2. The method as recited in claim 1 wherein the predetermined range of frequencies correspond to a radio frequency spectrum.

3. The method as recited in claim 1 wherein the each of the plurality of frequencies correspond to a channel within the radio frequency spectrum.

4. The method as recited in claim 1 wherein transmitting each of the selected ones includes transmitting each of the selected ones of the plurality of digitally encoded signals to each of the plurality of user programmable devices based on the one of the plurality of frequencies.

5. The method as recited in claim 1 wherein each of the plurality of user programmable devices include a predetermined signal format and wherein the method further includes converting each of the selected ones of the plurality of digitally encoded signals into each of the corresponding predetermined signal formats.

6. The method as recited in claim 5 wherein the predetermined signal format is an analog signal format.

7. The method as recited in claim 6 wherein each of the user programming is an analog signal and wherein transmitting the user programming includes converting each of the analog signals into a corresponding digital signal.

8. The method as recited in claim 7 wherein transmitting the user programming includes modulating each of the user programming.

9. The method as recited in claim 8 wherein modulating each of the user programming is performed utilizing a radio frequency modulator.

10. The method as recited in claim 1 wherein the plurality of user programmable devices are television receivers.

11. The method as recited in claim 1 wherein the digitally encoded signals are video signals.

12. The method as recited in claim 1 wherein the digitally encoded signals are audio signals.

13. For use with a network provider broadcasting multiple streams of compressed, digitally encoded signals, a system for transmitting the digitally encoded signals to a plurality of user programmable devices disposed in a single environment, the system comprising:

remote interface unit coupled to each of the user programmable devices for transmitting a user programming from each of the plurality of user programmable devices, each of the user programmable device the same or different one of the plurality of compressed, digitally encoded signals as each of the other user programmable devices; and a common set-top transceiver operatively connected to the network provider and to each of the remote interface units, the common set-top transceiver including:

a first receiver for receiving the user programming from each of the remote interface units;

a transmitter for transmitting each of the user programming to the network provider;

a second receiver for receiving each of the selected ones of the plurality of digitally encoded signals from the network provider; and a plurality of video processing modules, each being assigned a corresponding virtual address, for transmitting each of the selected ones of the plurality of digitally encoded signals to each of the plurality of user programmable devices based on the user programming transmitted by each of the user programmable devices and the virtual address of the associated video processing module.

14. The system as recited in claim 13 wherein each of the plurality of user programmable devices transmit and receive signals at a predetermined range of frequencies and wherein each of the virtual addresses is a predetermined frequency within the predetermined range of frequencies.

15. The system as recited in claim 14 wherein the predetermined range of frequencies correspond to a radio frequency spectrum.

16. The system as recited in claim 15 wherein each of the virtual addresses is a channel within the radio frequency spectrum.

17. The system as recited in claim 14 wherein the at least one video processing module transmits each of the selected ones of the plurality of digitally encoded signals to each of the plurality of user programmable devices based on the one of the plurality of frequencies.

18. The system as recited in claim 13 wherein each of the plurality of user programmable devices include a predetermined signal format and wherein the common set-top transceiver further includes a converter for converting each of the selected ones of the plurality of digitally encoded signals into each of the corresponding predetermined signal formats.

19. The system as recited in claim 18 wherein the predetermined signal format is an analog signal format.

20. The system as recited in claim 19 wherein each of the user programming is an analog signal and wherein the first receiver includes a second converter for converting each of the analog signals into a corresponding digital signal.

21. The system as recited in claim 13 wherein the user programming is performed utilizing a remote control and wherein each of the remote interface units include an infrared receiver for receiving the user programming from the remote control.

22. The system as recited in claim 21 wherein each of the remote interface units include a modulator for modulating the user programming.

23. The system as recited in claim 22 wherein the modulator is a radio frequency modulator.

24. The system as recited in claim 13 wherein the plurality of user programmable devices are television receivers.

25. The system as recited in claim 13 wherein the digitally encoded signals are video signals.

26. The system as recited in claim 13 wherein the digitally encoded signals are audio signals.

* * * * *

UNITED STATES PATENT AND TRADEMARK OFFICE
CERTIFICATE OF CORRECTION

PATENT NO. : 5,828,403
DATED      : October 27, 1998
INVENTOR(S): Stephan DeRodeff, Christopher J. Rust and Hugh Josephs It is certified that error appears in the above-identified patent and that said Letters Patent is hereby corrected as shown below: On the title page, Item [75],
Please add inventor --Hugh Josephs, Boulder Colorado Signed and Sealed this Twenty-fifth Day of May, 1999

*Attest:*

Q. TODD DICKINSON

*Attesting Officer*     *Acting Commissioner of Patents and Trademarks*